United States Patent [19]

Sizer, II

[11] Patent Number: 5,566,231
[45] Date of Patent: Oct. 15, 1996

[54] APPARATUS AND SYSTEM FOR RECORDING AND ACCESSING INFORMATION RECEIVED OVER A TELEPHONE NETWORK

[75] Inventor: Theodore Sizer, II, Little Silver, N.J.

[73] Assignee: Lucent Technologies Inc., Murray Hill, N.J.

[21] Appl. No.: 330,153

[22] Filed: Oct. 27, 1994

[51] Int. Cl.$^6$ .......................... H04M 15/00; H04M 15/06
[52] U.S. Cl. .......................... 379/142; 379/127; 379/128; 379/130
[58] Field of Search .................................. 379/102, 105, 379/127, 128, 142, 130; 348/10, 14; 455/4.1, 4.2

[56] References Cited

U.S. PATENT DOCUMENTS

| | | | |
|---|---|---|---|
| 4,885,766 | 12/1989 | Yasuoka | 379/105 |
| 5,014,125 | 5/1991 | Pocock | 455/4.1 |
| 5,027,426 | 6/1991 | Chiocca | 379/105 |
| 5,247,347 | 9/1993 | Litteral | 455/4.2 |
| 5,329,308 | 7/1994 | Binns | 348/14 |

*Primary Examiner*—Wellington Chin
*Assistant Examiner*—Vijay Shankar

[57] ABSTRACT

An apparatus and system records and accesses information from a telephone network. A premises recording unit has a housing which is connected to an outside information source via the first communication channel. A premises recording system is mounted within the housing and records information, telephone messages and prompts received along the first communication channel. The premises recording system includes an interface for connecting to a video display, a television set, for displaying stored information, messages and prompts. The premises recording system further includes a microprocessor and a memory for storing the information, telephone messages and prompts received along the first communication channel. The premises recording unit is responsive to signals received from a premises control unit along a second communication control channel extending between the premises control unit and the premises recording unit for retrieving stored information, telephone messages and prompts and displaying same on a video display. A local bus is operatively connected to the premises recording unit and includes an expansion bus and cartridge slots for receiving cartridges for interconnecting with the expansion bus and expanding the various functions of the premises recording unit.

30 Claims, 4 Drawing Sheets

APPARATUS AND SYSTEM FOR RECORDING AND ACCESSING INFORMATION RECEIVED OVER A TELEPHONE NETWORK

This invention is related to U.S. Pat. application Ser. No. 08/292,476 filed Aug. 18, 1994, entitled Apparatus For Providing A Graphical Control Interface, and copending application Ser. No. 08/330,173 entitled, "System and Apparatus For Recording And Accessing Information Received Over A Phone Network Using A Premises Phone For Control," filed on Oct. 27, 1994 hereof by the same inventor.

FIELD OF THE INVENTION

This invention relates to an apparatus and system for recording and accessing information such as telephone messages received over a telephone network.

BACKGROUND OF THE INVENTION

Most ordinary answering machines are limited in function. They record a message and play it back at a later date. The advent of more sophisticated telephone network services in buildings and in the general population, as well as more sophisticated cable and telephone systems, allows greater potential for recording information, telephone messages and prompts transmitted into a recording unit from a communication channel operatively connected to a telephone network or cable system.

Sophisticated information is now available, such as caller identification, time of call, video data, billing and credit information, interactive multimedia and other data. With the increase of information becoming difficult to manage, it is desirable sometimes to separate the information or classify the main parts until it can be analyzed later, such as on playback from a recording unit. It would also be desirable if some information such as the identification of the caller, the time of the call, and other pertinent details could be displayed on a video display such as a television set. This may be important to users who desire their premises to be a safe haven from numerous phone calls, while allowing some calls which have been recorded to be handled at a later time.

Such a unit would also have to be expandable to allow adaptability to different services which could be offered on a network. New services are increasingly important, and any unit should be adaptable for a wide range of services. Additionally, the unit should be usable by a homeowner within the premises without much difficulty.

SUMMARY OF THE INVENTION

The present invention overcomes the disadvantages of standard telephone recording machines that record voice messages which can be played back for listening at a later date. The present invention is a premises recording unit which now allows recording of information, such as digital information, telephone messages and prompts received along a first communication channel such as from the network while also displaying the messages on a video display, such a television set, in response to control signals received from a premises control unit, such as a remote control device. The premises recording unit has a cartridge slot for receiving cartridges for interconnecting with the expansion bus for expanding the various functions of the premises recording unit.

In accordance with the present invention, the apparatus includes a housing and an interface network connector for connecting the unit to an information source such as a telephone network via a first communication channel. A premises recording means is mounted within the housing and records information, such as digital information, telephone messages and prompts received along the first communication channel. The premises recording means includes an interface with a video display such as a telephone set for displaying stored information, messages and prompts. The premises recording means includes a microprocessor and memory means for storing the information, telephone messages and prompts received along the first communication channel.

A local bus is operatively connected to the microprocessor and includes an expansion bus and a cartridge slot for receiving cartridges for interconnection with the expansion bus for expanding the various functions of the premises recording unit.

In one aspect of the invention, the premises recording unit includes an infrared sensor receiver operatively connected to the processor for receiving infrared signals. The premises recording unit is responsive to the infrared control signals which are generated by a premises control unit such as a hand-held remote control.

In another aspect of the invention, a modem cartridge can be inserted into a cartridge slot, or a modem is operatively connected to the network interface connector and the premises recording unit for receiving information along the first communication channel. The first communication channel is operatively connected to a telephone network.

The memory stores caller identification information related to an incoming telephone call having a caller identifier code. The premises recording unit can also be responsive to DTMF tones generated from a network phone to enable the network phone to retrieve and prompt messages from the premises recording unit. In another aspect of the invention, the premises recording unit includes voice recognition circuitry for responding to voice commands. The apparatus and system also can receive fax messages and includes a means for recording the incoming faxes for display on a television set and the like.

A standard television cable can connect to the premises recording unit. A cable setup box can be operatively connected to the cable and the premises recording unit, and includes control means for routing information to the video display interface connector. A premises phone can be connected to the premises recording unit to receive incoming calls.

DESCRIPTION OF THE DRAWINGS

The foregoing advantages and features of the present invention will be appreciated more fully from the following description, with reference to the accompanying drawings in which.

DETAILED DESCRIPTION OF THE INVENTION

Figure 1:
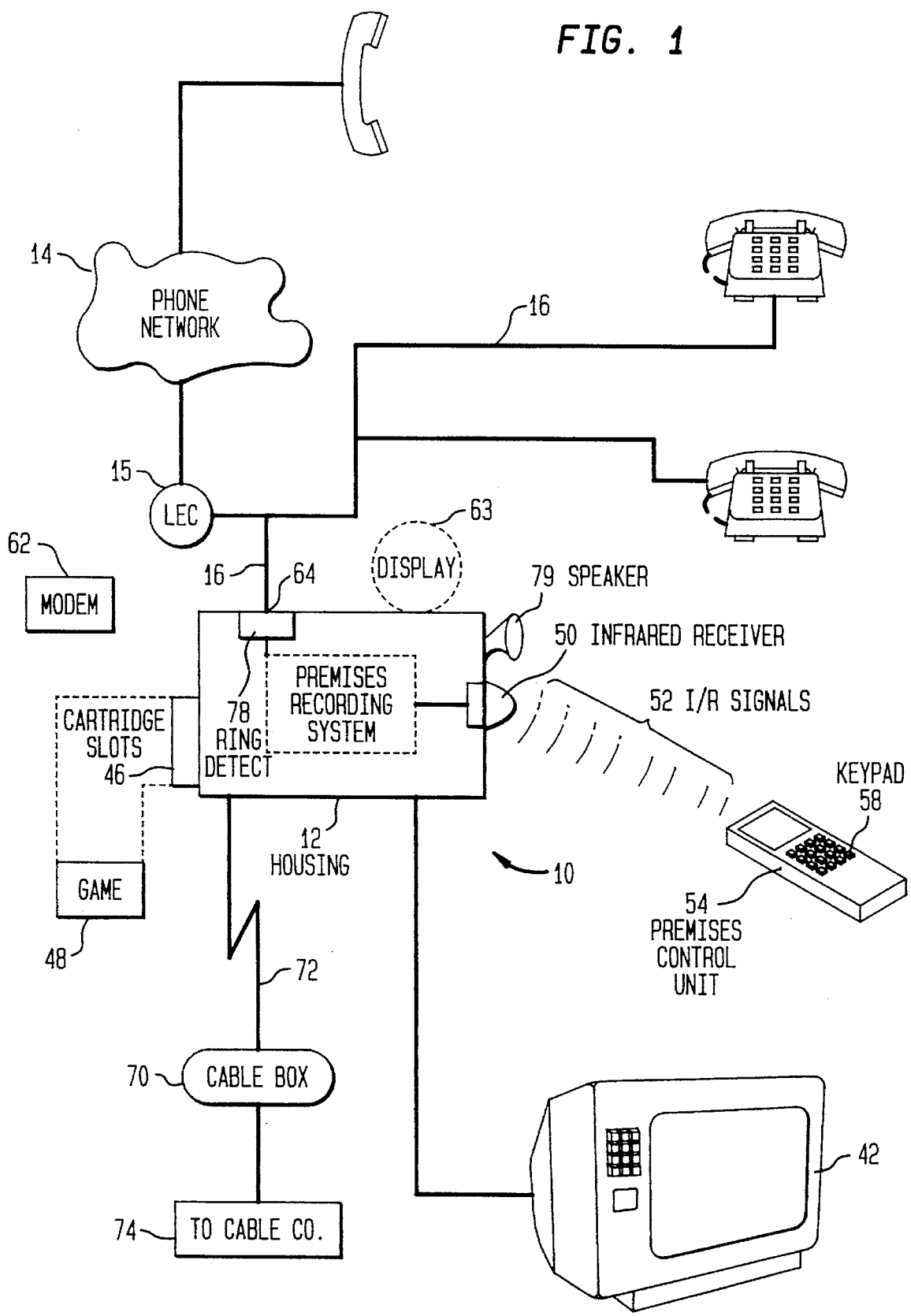
FIG. 1 is a schematic environmental view of the apparatus and system of the present invention that records and accesses information received along a first communication channel connected to a telephone network.

Referring now to FIG. 1, there is illustrated an apparatus in accordance with the present invention which records and accesses information received over a first communication channel. This apparatus is referred to generally as a premises recording unit and is generally illustrated at 10. The unit 10 includes a housing 12, and is connected to an information source such as a telephone network 14 which includes a local office 15. Although the illustrated embodiment shows an outside telephone network, one skilled in the art will realize the network could be a local or wide area network of various types, including a telephone network. The premises recording unit 10 is connected to a first communication channel 16, which could be twisted wire pair or other communication system known to those skilled in the art.

Figure 2:
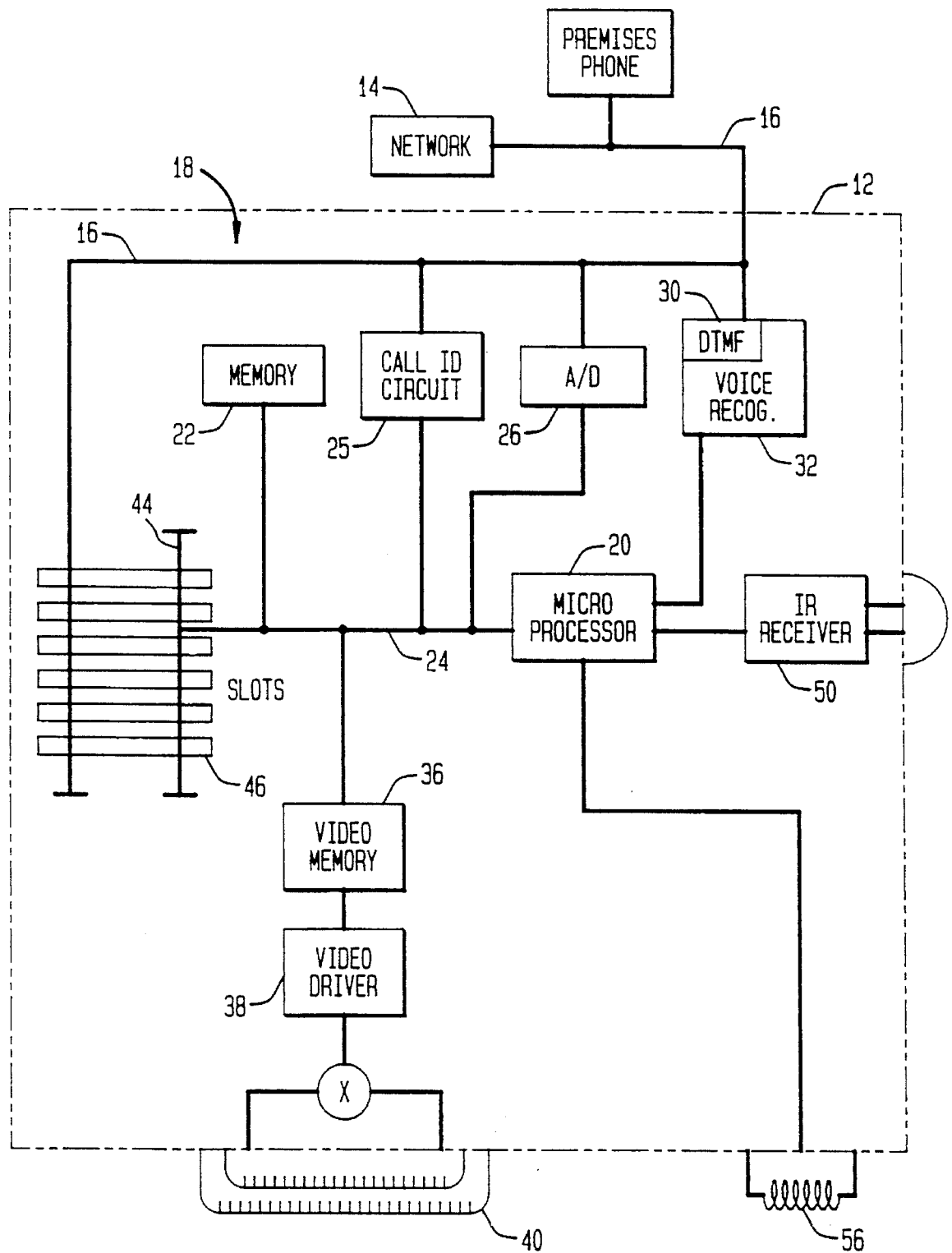
FIG. 2 is a high level block diagram of the various memory and processing components premises recording unit of the present invention.

As shown in FIGS. 1 and 2, a premises recording system, indicated generally at 18, is mounted within the housing for recording information, telephone messages and prompts received along the first communication channel 16.

As shown in greater detail in FIG. 2, the premises recording system 18 further includes a microprocessor 20, and a memory 22, which stores information, telephone messages and prompts received along the first communication channel 16. The microprocessor 20 and memory 22 are connected along a digital bus 24. The memory can be RAM or other known memory devices.

The premises recording system 18 also includes a caller identification circuit 25 for identifying a caller such as by the caller ID codes now a part of many network calls. The caller identification circuit 25 is connected to the first communication channel 16, also called the incoming line. An analog-to-digital convertor 26 is connected along the digital bus and first communication channel 16 to receive analog signals transmitted along that incoming line. The analog signals are converted to digital signals, which then can be stored in memory 22 and processed by the microprocessor 20. A dual tone multi-frequency detection circuit 30 is also a part of the premises recording system 18 as well as voice recognition circuitry 32 for responding to voice commands. Both circuits 30, 32 connect to the microprocessor 20 and the first communication channel 16. A video memory circuit 36 and video driver circuit 38 are connected to the digital bus. A standard video interface connector 40 is mounted on the housing and connected to circuits 36, 38 to interface with a video display such as the television set 42 for displaying stored information, telephone messages and prompts (FIG. 1).

The digital bus 24 also includes an expansion bus 44. Cartridge slots 46 are formed in the housing 12 and can receive cartridges 48 for interconnecting with the expansion bus 44 and expanding the various functions of the premises recording unit 10.

The premises recording unit 10 includes an infrared receiver 50 operatively connected to the microprocessor 20 and the digital bus 24 for receiving infrared control signals 52 generated from a source such as a premises control unit 54 (FIG. 1). The premises recording system 18 is responsive to infrared control signals 52 so that stored information, telephone messages and prompts can be retrieved and displayed on the video display such as the television set 42.

In one preferred aspect of the present invention, the premises control unit 54 is an infrared generator that generates a sequence of infrared control signals along a second communication channel defined in the air space of a premises to the infrared receiver 50. These signals could be bounced off a light colored ceiling, such as found in many homes. In another aspect of the present invention, the premises control unit 54 is a hand held remote control that can include a key pad 58 for inputting desired functions that correspond to a desired sequence of operations by the premises recording unit (FIG. 1). A standard, universal remote may also be used with some functions. The use of a universal remote, however, will depend on the desired functions required in the premises recording unit.

A serial port 56 can be also connected to the microprocessor so that an external modem or other serial device can be connected thereto (FIG. 2). The serial port 58 can accommodate a separate controller, modem, or other device.

In one aspect of the present invention as shown in FIG. 1, a modem cartridge 62 can be inserted within the cartridge slot 46 and operatively connected to the digital bus 24 via the expansion bus 44. In another aspect of the present invention, a display 63 can be mounted directly on the premises recording unit. A premises phone (not shown) can be connected to the premises recording unit through a standard phone connection 64.

As illustrated in FIG. 1, a cable setup box 70 is operatively connected to an incoming cable line 72 from a cable company 74 and the premises recording unit 10. The cable loops through the unit 10 to the television 42. Because the premises recording system 18 also includes a microprocessor 20, memory 22, and expandable bus 24, additional hardware or programming software can be added so that the unit 10 can receive, store and process information received from the cable. This can be advantageous if telephone systems and cable systems merge into one communication system.

Additionally, the premises recording system 18 may include a ring detection circuit 78 (FIG. 1) which registers the number of rings made by a premises phone. After a predetermined number of unanswered rings, the call is answered by the unit 10. The call is then routed to the unit 10, which can play a prerecorded message. The caller then can follow announcements and prompts to retrieve messages or leave other messages, or download information such as digital data. An internal or external speaker 79 may be used. Also, any recorded messages could be played through the television 42.

Also, the unit 10 can be controlled by a selected DTMF sequence from a network phone, such as an outside caller. The unit 10 can be programmed to give prerecorded answers. An additional memory system (not shown) could provide prerecorded responses, such as prompts, for instructing the caller of how to respond to retrieve messages in or out of the home.

The unit 10 also can be programmed to give visual prompting to a user by means of the interface with the television. The use of cartridges also ensures "plug and play" simplicity, making operation and use of the unit 10 simple. No additional wiring is necessary with the present unit. Additional RAM 80 can provide additional "fast" storage for file storage.

Figure 3:
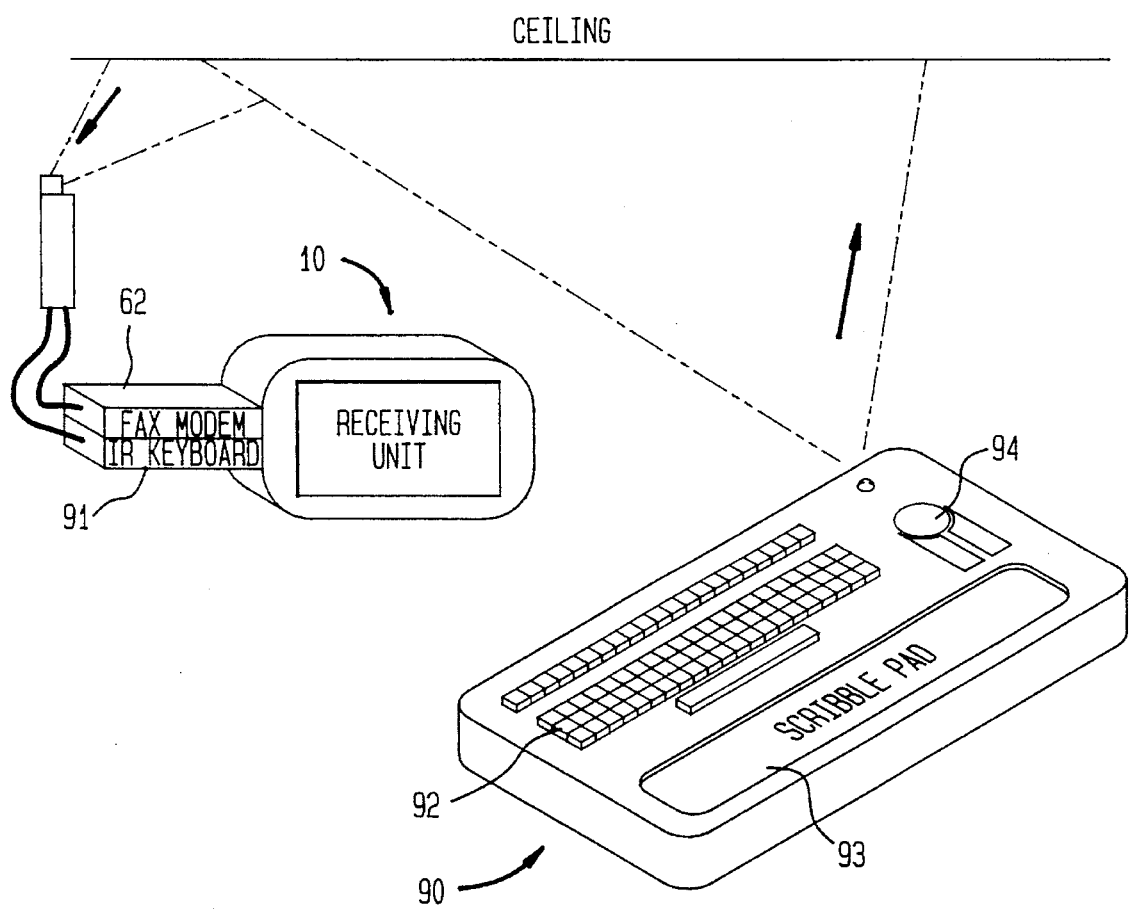
FIG. 3 is a high level flow chart depicting one sequence of the possible steps for storing and accessing information within the premises recording unit.
Figure 4:
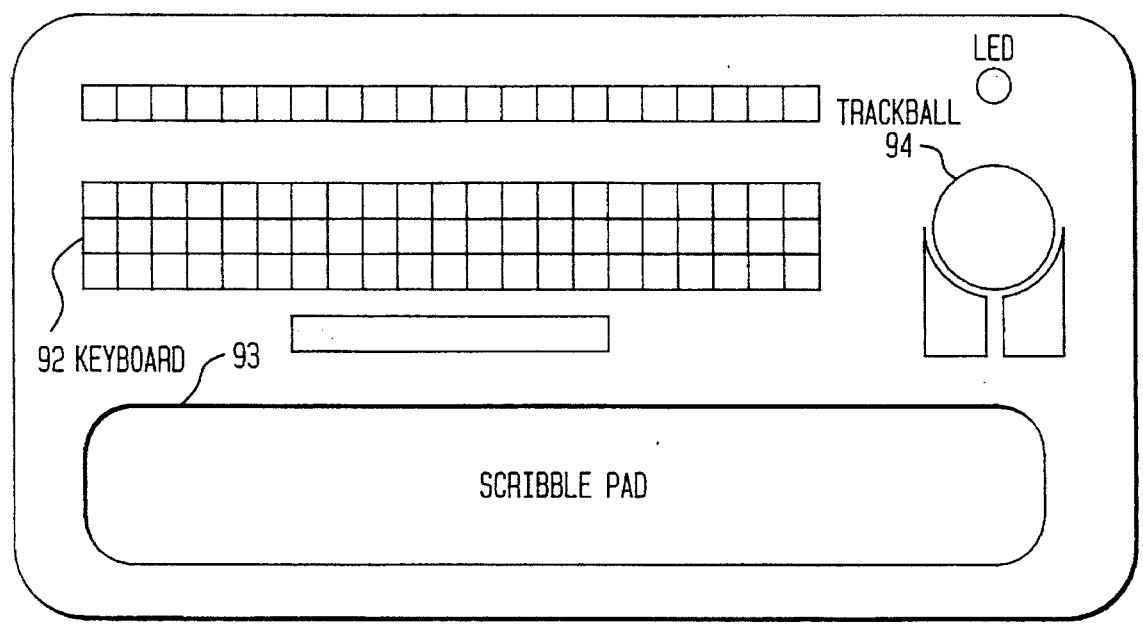
FIG. 4 is a schematic plan view of the combination infrared keyboard, scribble pad and track ball.
Figure 5:
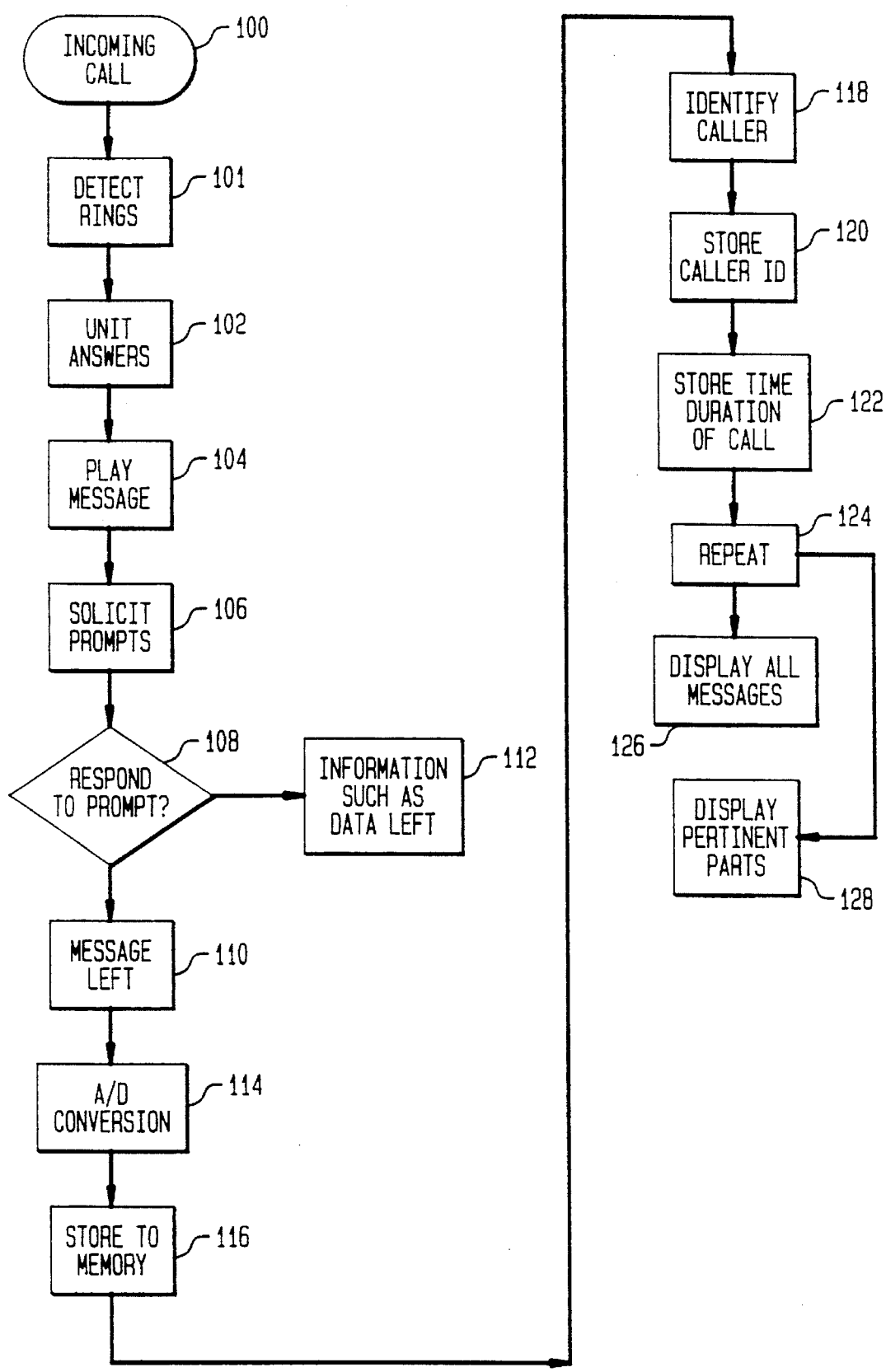
FIG. 5 is a high level flow chart depicting one sequence of the possible steps for storing and accessing information within the premises recording unit.

The unit 10 can also receive JPEG files which are compressed still images, An additional cartridge can hold JPEG Fax software to generate menus and allow color display on the TV using the internal video RAM. JPEG files reside in FAX/Modem memory, premises control unit memory, or on a disk. A modem can also transfer color images for displaying on the television or other display. The remote control keypad 58 can be more complicated, and include various other structure and functions, such as a full alphanumeric keypad, scratchpad or trackball (not shown). Additionally, the unit 10 can be programmed to conduct banking, or other services so that financial data can be downloaded to the unit Additionally, as shown in FIG. 3, a separate combination keyboard/scribble pad/track ball, indicated generally at 90, and which generates infrared signals, can control the premises recording unit 10. Additional control can be obtained through a selected cartridge 91 inserted within the slot attached to the expansion bus. The combination keyboard can include the standard keyboard 92, a scribble pad 93 and a track ball 94 as shown in FIG. 4. Commands can be echoed on the video display such as the television. Faxes can be created as well as E-mail messages when an appropriate cartridge is used. Other cartridges can be used such as game cartridges. Also complicated game software can be delivered over various information channels such as the network.

The flow chart illustrates the various steps of just one aspect of the premises recording unit of the present invention.

For purposes of understanding, the blocks of the flow chart are numbered with numerals starting in the 100 series.

A call initially comes into the premises 100 (Block 100). The ring detect circuit 78 detects the number of rings. After a predetermined number of rings, the premises recording system 18 (block 102) answers. A message is played (Block 104), asking for several prompts (Block 106). The caller responds by depressing the desired key numbers corresponding to a desired DTMF tone sequence (Block 108). Depending on the particular DTMF sequence, a message can be left, or further information such as a data uploaded to the unit 10 (Block 112). If a message is left, the A/D converter converts the analog message to digital format (Block 114) which can be saved within the memory RAM or other memory (Block 116). Depending on the call identification code (if any), the caller is identified (Block 118), and this information stored (Block 120), as well as the time and duration of the call (Block 122). This step is repeated for all calls (Block 124). The premises user then operates the premises control unit 54 to display all messages (Block 126) or just pertinent parts of each message (Block 128) such as on the television.

It is to be understood that the above description is only one preferred embodiment of the invention. Numerous other arrangements may be devised by one skilled in the art without departing from the spirit and scope of the invention.

That which is claimed is:

1. An apparatus for recording and accessing information comprising;

a housing, premises recording means mounted within said housing for recording information, telephone messages and prompts received along a first communication channel, means for connecting said premises recording means to said first communication channel, said premises recording means including means for interfacing with a video display for displaying stored information, messages and prompts, said premises recording means further including a microprocessor and memory means for storing information, telephone messages and prompts received along the first communication channel, said premises recording means being responsive to signals received from a premises control unit along a second communication channel extending between a premises control unit and said premises recording means for retrieving stored information, telephone messages and prompts, and displaying same on a video display, a local bus operatively connected to said premises recording means, and including an expansion bus, and a cartridge slot for receiving cartridges for interconnection with said expansion bus for expanding the various functions of said premise recording means.

2. The apparatus according to claim 1 including a modem cartridge for insertion into said cartridge slot.

3. The apparatus according to claim 1 including a modem operatively connected to said first communication channel connection means and said premises recording means for receiving incoming information along said first communication channel.

4. The apparatus according to claim 1 wherein said first communication channel is operatively connected to a telephone network.

5. The apparatus according to claim 4 including memory means for storing caller identification information related to an incoming telephone call having a caller identification code.

6. The apparatus according to claim 4 wherein said premises recording means is responsive to DTMF tones generated from a network phone to enable said network phone to retrieve and prompt messages from said premises recording means.

7. The apparatus according to claim 1 wherein said premises recording means is responsive to a predetermined dual tone multifrequency tone (DTMF) sequence received along said first communication channel.

8. The apparatus according to claim 1 including a video display mounted to the housing for displaying any stored information, messages and prompts.

9. The apparatus according to claim 1 wherein said premises recording means includes voice recognition circuitry for responding to voice commands.

10. The apparatus according to claim 1 wherein said premises recording means includes infrared sensing means, said second communication channel comprising means for carrying an infrared control signal from a premises control unit to said premises recording means for enabling control of said premises recording means via an infrared signal generated from a premises control unit.

11. The apparatus according to claim 10 wherein said premises control unit comprises a handheld remote control unit.

12. The apparatus according to claim 1 including means for receiving fax messages, said premises recording means including means for recording an incoming fax message for future display on a video display.

13. The apparatus according to claim 1 including a cable communication channel, a cable setup box operatively connected to the cable communication channel and the premises recording unit, wherein the premises recording unit includes control means for routing information to the video display interface means.

14. The apparatus according to claim 1 including means for connecting a premises phone to the premises recording unit.

15. A system for recording and accessing information received over a telephone network comprising:

a) a premises recording unit, including
   a housing,
   means for connecting said unit to a telephone network via a first communication channel,
   premises recording means mounted within said housing for recording information, telephone messages and prompts received from the telephone network along said first communication channel,
   said premises recording means including means for interfacing with a video display for displaying stored information, messages and prompts,
   said premises recording means further including a microprocessor and memory means for storing information, telephone messages and prompts received from the telephone network along the first communication channel,
   a local bus operatively connected to said premises recording means, and including an expansion bus,
   a cartridge slot for receiving cartridges for interconnection with said expansion bus for expanding functionality of said premise recording means,
   infrared sensing means operatively connected to the premises recording means for receiving infrared control signals, said premises recording means being responsive to infrared control signals, and
b) a premises control unit, including means for generating a sequence of infrared control signals along a second communication channel to the infrared sensing means of the premises recording means.

16. The system according to claim 15 including a modem cartridge for insertion into said cartridge slot.

17. The system according to claim 15 including a modem operatively connected to said premises connection means and said premises recording means for receiving incoming information from along said first communication channel.

18. The system according to claim 15 wherein said first communication channel is operatively connected to a telephone network.

19. The system according to claim 18 including memory means for storing caller identification information related to an incoming telephone call having a caller identification code.

20. The system according to claim 18 wherein said premises recording means is responsive to DTMF tones generated from a network phone to enable said network phone to retrieve and prompt messages from said premises recording means.

21. The system according to claim 15 wherein said premises recording means is responsive to a predetermined dual tone multifrequency tone (DTMF) sequence received along said first communication channel.

22. The system according to claim 15 including a video display mounted to the housing for displaying any stored information, messages and prompts.

23. The system according to claim 15 wherein said premises recording means includes voice recognition circuitry for responding to voice commands.

24. The system according to claim 15 wherein said premises control unit comprises a handheld remote control unit.

25. The system according to claim 15 including means for receiving fax messages, said premises regarding means including means for recording an incoming fax message for future display on a video display.

26. The system according to claim 15 including a cable communication channel, a cable setup box operatively connected to the cable communication channel and the premises recording unit, wherein the premises recording unit includes control means for routing information to the video display interface means.

27. The system according to claim 15 including means for connecting a premises phone to the premises recording unit.

28. An apparatus for recording and accessing telephone information comprising:
   premises recording means for storing telephone information received over a first communication channel,
   means for connecting said premises recording means to said first communication channel,
   said premises recording means including means for interfacing with a video display for displaying stored telephone information,
   said premises recording means further including a microprocessor and memory means for storing telephone information received over the first communication channel,
   said premises recording means being responsive to signals received from a wireless premises control unit for retrieving stored ..telephone information and displaying same on the video display,
   a bus operatively connected to said premises recording means and
   a cartridge slot interconnected to said bus for receiving cartridges for controlling functions of said premises recording means.

29. An apparatus for recording and accessing information according to claim 1 wherein said video display comprises a television set.

30. An apparatus for recording and accessing information according to claim 15 wherein said video display comprises a television set.

* * * * *